United States Patent
Vojtech et al.

(10) Patent No.: US 8,945,654 B1
(45) Date of Patent: Feb. 3, 2015

(54) CHEESE PRODUCT HAVING A VEINED APPEARANCE

(75) Inventors: John Vojtech, Arden Hills, MN (US); Jason Eckert, Forest Lake, MN (US)

(73) Assignee: Purina Animal Nutrition LLC, Shoreview, MN (US)

( * ) Notice: Subject to any disclaimer, the term of this patent is extended or adjusted under 35 U.S.C. 154(b) by 158 days.

(21) Appl. No.: 12/842,433

(22) Filed: Jul. 23, 2010

Related U.S. Application Data

(62) Division of application No. 11/281,068, filed on Nov. 17, 2005, now Pat. No. 7,785,644.

(60) Provisional application No. 60/629,485, filed on Nov. 19, 2004.

(51) Int. Cl.
  *A23C 19/00* (2006.01)

(52) U.S. Cl.
  USPC ........... 426/582; 426/250; 426/540; 426/580; 426/661

(58) Field of Classification Search
  USPC ................ 426/250, 540, 580, 582, 658, 661
  See application file for complete search history.

(56) References Cited

U.S. PATENT DOCUMENTS

| | | | |
|---|---|---|---|
| 2,777,124 A | 1/1957 | Locatelli | |
| 2,872,324 A | 2/1959 | Locatelli | |
| 3,865,952 A * | 2/1975 | Ney et al. ...................... | 426/533 |
| 3,973,042 A | 8/1976 | Kosikowski et al. | |
| 4,248,897 A | 2/1981 | Christensen et al. | |
| 4,382,969 A | 5/1983 | Sadler | |
| 4,568,548 A | 2/1986 | Sprenger | |
| 4,911,935 A * | 3/1990 | Fillaud et al. .................. | 426/36 |
| 4,965,078 A | 10/1990 | Van Leeuwen et al. | |
| 5,194,283 A | 3/1993 | Dupas et al. | |
| 5,225,220 A | 7/1993 | Gamay | |
| 5,395,630 A | 3/1995 | Gamay | |
| 5,549,916 A | 8/1996 | Gamay | |

FOREIGN PATENT DOCUMENTS

FR 2310084 1/1997

OTHER PUBLICATIONS

"Sample Request Shipping List—Food Sample List"; Quali Tech, Inc.; Jan. 6, 2004.

* cited by examiner

*Primary Examiner* — Leslie Wong

(74) *Attorney, Agent, or Firm* — Dorsey & Whitney LLP

(57) ABSTRACT

A method of producing a food product such as a colored veined cheese product includes providing a cheese curd to which a flavorant is added. The cheese curd and the flavorant are worked into a homogenous mixture. A colored vein mimetic is added to the homogeneous mixture in an amount for a time sufficient to produce the colored veins within the cheese product such that the cheese product has a flavor and an appearance of a naturally veined cheese.

17 Claims, No Drawings

CHEESE PRODUCT HAVING A VEINED APPEARANCE

CROSS-REFERENCE TO RELATED APPLICATION

The present application is based on and claims the benefit of U.S. provisional patent application Ser. No. 60/629,485, filed Nov. 19, 2004, the content of which is hereby incorporated by reference in its entirety.

The present application is a divisional of and claims priority of U.S. patent application Ser. No. 11/281,068, filed Nov. 17, 2005, now U.S. Pat. No. 7,785,644, the content of which is hereby incorporated by reference in its entirety.

BACKGROUND OF THE INVENTION

The present invention relates to a method of making a cheese product that has the appearance of a mold ripened veined cheese. More particularly, the present invention includes a method of mixing a colorant into the cheese product to produce a cheese product having the appearance of a mold ripened veined cheese.

The most important mold ripened, veined cheeses are blue veined cheeses such as Blue cheese, Gorgonzola cheese, Stilton cheese and Roquefort cheese such cheeses are produced by inoculating either milk, a curd, or a formed cheese with selected mold spores such as, but not limited to, *Penicillium roqueforti* or *Penicillium glaucum*. The mold spores are typically dispersed throughout the milk, the curd or the formed cheese and create distinctive flavor components by breaking down fat, protein and milk sugar such as lactose. In addition to providing the distinctive flavors of the veined cheese, the mold spores also create the veined appearance that provides a strong visual association with the cheese's distinctive flavor.

SUMMARY OF THE INVENTION

The present invention includes a method of producing a food product such as a colored veined process cheese. The method includes working a cheese curd into a homogenous mixture. A colored vein mimetic is then added to the homogenous mixture. The homogenous mixture and the colored veined mimetic are agitated for a time sufficient to produce the colored veined cheese having an appearance and a taste of a natural colored veined cheese. Flavorant may also be added to the cheese curd.

The present invention also includes an alternative method of making a colored veined natural cheese product in which a colored vein mimetic is added to a cheese curds and optionally flavors are added. The cheese curd and vein mimetic are mixed and pressed to form colored veined cheese having an appearance and taste of a natural colored veined cheese.

The present invention also includes a method of making a cheese product in which a coloring dye and optionally flavoring are added to a non-curd cheese product, the non-curd cheese product is then blended with a natural cheese curd and pressed into a cheese product whose appearance has colored seams between the pressed curds. The present invention also includes a product having colored seams defined by the curds.

DETAILED DESCRIPTION OF THE PREFERRED EMBODIMENTS

The present invention includes a method of producing a food product and the food product such as a cheese based product that has the taste and appearance of a natural colored veined cheese. By colored veined cheese is meant a cheese having a vein that has a color distinct from the cheese body. A colored vein mimetic is used to produce the appearance of veined cheese. By colored vein mimetic is meant a composition, component(s) or compound(s) that when added to the cheese curd, either after working the cheese curd into a homogeneous mixture or directly to the curds, forms a veinous appearance within the homogeneous mixture or disburses along the outer surface of the curds. By veinous appearance is meant visually discernable streaks, filaments or seams within the product.

One aspect of the present invention is to provide a blue veined cheese that in appearance and taste resembles natural blue veined cheeses such as Blue cheese, Roquefort, Stilton and Gorgonzola. However, the present invention may also include food products having colored veins of colors other than blue. It should also be understood that by the color blue is meant to include various shades of blue since the mold spores used to produce the natural blue veins in blue veined cheese vary in their blue color. For example, Gorgonzola cheese may have a blue-green vein. The blue color may also extend to a greenish blue color. An important aspect of the present invention is that the blue vein is produced without the use of mold spores which are used to produce the blue veins in Blue Cheese, Roquefort, Stilton and Gorgonzola cheeses. The cheese based product of the present invention includes natural cheese, pasteurized process cheese, pasteurized process cheese food, pasteurized process cheese spread, pasteurized process cheese products, imitation or analog cheese the compositions of which are well known and other food products.

A component of the cheese based product is a dairy based fraction that can be either a water-in-oil emulsion or an oil-in-water emulsion depending upon the type of the cheese based product to be produced. The dairy based fraction can also be manufactured by mixing selected amounts of water, milkfat and solids to produce either the oil-in-water emulsion or the water-in-oil emulsion.

Preferably, the dairy based fraction is cheese curd which has been processed to remove whey from the curd. The cheese curd can be one of any number of types of cheese curd, including but not limited to, Anejo Enchilado, Asadero, Asiago, Blue, Brick, Brie, Cabrales, Caciocavallo, Camembert, Cheddar, Cheshire, Chevre, Chihuahua, Colby, Colby Jack, Cotija, Cream Cheese, Edam, Emmental, Farmer, Feta, Fontina, Gammelost, Garrotxa, Gloucester, Gorgonzola, Gouda, Granular, Grating, Gruyere, Hard Cheese, Havarti, Idiazabal, Kasseri, Limburger, Mahon, Manchego, Mascarpone, Monterey Jack, Mozzarella, Muenster, Neufchatel, Nuworld, Oaxaca, Panela, Parmesan, Picon, Provolone, Quark, Queso Blanco, Queso Fresco, Queso Quesadilla, Ricotta, Romano, Roncal, Roquefort, Samsoe, Sap Sago, Scamorza, Semisoft, Skim, Soft Ripened, Stilton, Stirred Curd, Swiss, Tetilla, Washed Curd, White Cheese and Colored Cheese, or any mixture thereof. A preferred cheese curd is Provolone cheese curd.

The dairy based fraction makes up between 10-99 weight percent of the total weight of the cheese based product. Preferably, the dairy based fraction makes up between about 75-80 weight percent of the total weight of the cheese based product.

The dairy based fraction is added to a mixer and subjected to agitation. A preferred mixer is a paddle mixer manufactured by Marion Mixers, Inc. of Marion, Iowa.

While subjected to agitation, optional dairy components may be added to adjust the fat to solids ratio of the dairy based fraction. Preferably, a dry cream is added to the dairy based fraction to produce a selected fat to solids ratio of the dairy based fraction. A preferred dry cream is Melocreme, manufactured by Kerry Ingredients of Beloit, Wis.

With the fat to solids ratio of the dairy based fraction at about the selected ratio, the pH of the dairy based fraction may be adjusted with an addition of an effective amount of an edible acid, preferably citric acid to achieve desired flavor characteristics. The edible acid is added to adjust the pH of the dairy based fraction to a range of between about 4.6 and 6.2, and preferably to about 5.3. Besides using citric acid as the edible acid, other edible acids are also within the scope of the present invention, including, but not limited to, lactic acid, tannic acid, malic acid, gluconic acid, glycolic acid, pyruvic acid, glutamic acid, fumaric acid, succinic acid, isocitric acid, pimelic acid, linear polycarboxylic acids, such as oxalic acid, malonic acid, succinic acid, gluratic acid, acetic acid, propionic acid, butyric acid, and adipic acid; and anhydrides that break down into acids on contact with water, such as acetic anhydride, butyric anhydride, succinic anhydride or any combination thereof.

With the pH of the blend at the selected pH, preferably about 5.3, an effective amount of an emulsifying salt may be added to the homogenous blend. By an effective amount of emulsifying salt is meant an amount sufficient to enhance the emulsifying properties of the casein protein to promote a stable emulsion so that upon heating of the cheese product the fat does not separate or oil off. A non-exhaustive list of emulsifying salts that can be added to the homogenous blend include, but are not limited to, sodium citrate, potassium citrate, monosodium phosphate, disodium phosphate, trisodium phosphate, sodium aluminum phosphate, sodium tripolyphosphate, sodium hexametaphosphate, dipotassium phosphate, sodium acid pyrophosphate, and the like, as well as mixtures thereof. A preferred emulsifying salt is disodium phosphate. Other emulsifiers, including but are not limited to lecithin, monoglycerides, diglycerides, polysorbate 60, or Complemix 100 may be added as a replacement or supplement to emulsifying salts.

Although not necessary to practice the present invention, the emulsifying salt aids in providing flowing characteristics of a process cheese such that the cheese based product flows and melts when heated. The emulsifying salts are added to the homogeneous blend such that the emulsifying salts preferably make up approximately 1.0 weight percent of the total weight of the cheese based product).

When the salts are added to the homogeneous blend, the blend is worked for a selected period of time to evenly disperse the salts throughout the homogeneous blend thereby retaining the homogeneous quality of the blend. Preferably, the salts are mixed into the homogeneous blend with the Marion paddle mixer for about 5 minutes at a temperature of 60 to 130 degrees fahrenheit, although other mixing periods, vessels and temperatures are within the scope of the present invention provided that at the end of the mixing period the emulsifying salts are uniformly dispersed and optionally melted throughout the blend.

Optionally, other ingredients may be added to the blend before or after the emulsifying salts. A non-exhaustive list of other ingredients that may optionally be added to the blend includes flavorants, such as egg flavor, a lactic acid starter blend, a starter distillate, flavorants, and salt; acidulants such as edible acids and edible acid anhydrides, including citric acid, hydrochloric acid, lactic acid, lemon juice powder; cheese; enzyme modified cheese; eggs; edible particulates such as bread crumbs, chopped nuts, meat, fruits, dried vegetables; herbs and seasonings; cordials and alcoholic beverages such as wine or beer; cocoa liquor; sweeteners such as sugar or corn syrup; artificial sweeteners; and starch. Additionally, colorants such as annatto, beta carotene, turmeric, FD&C dyes, and titanium dioxide may be optionally added to enhance the color of the blend.

What is meant by flavorant is a material which imparts a flavor or mouth feel to the finished product, including but not limited to Enzyme Modified Cheese, Natural Flavor, Artificial Flavor, WONF (natural flavor enhanced with other natural flavors or other materials that depart a desired flavor or mouth feel in the finished product).

Optionally, the homogenous blend is transferred to a cheese cooker wherein the homogenous blend is heated for an amount of time sufficient to cook the homogenous blend into the cheese based product. Preferably, the homogeneous blend is heated under agitation with steam injection to about a range of about 110° F. and 230° F., and preferably to about 165° F. for about thirty seconds. With the homogenous blend heated to about 165° F., the steam injection is removed from the homogenous blend while maintaining agitation of the homogenous blend for another selected period of time, preferably 1½ minutes. The homogeneous blend is worked until it becomes a thick viscous mass having a plastic consistency. A preferred cheese cooker is a twin screw lay down process cheese cooker manufactured by Custom Stainless Equipment of Santa Rosa, Calif.

With the homogenous blend heated and cooked for the select amount of time, the blend has the taste of a natural blue veined cheese such as Blue cheese. However, while the cheese based product has the taste of a natural Blue cheese, the cheese based product does not yet have the characteristic blue veined coloring that consumers associate with a mold ripened blue veined cheese.

To provide the characteristic blue veined coloring within the cheese based product, an effective amount of a colorant or a blend of colorants are added to the unagitated product. Preferably, the colorants are either a green or blue color that does not run or fade over time. The colorant is preferably a blue vein mimetic that is typically a solid particulate at room temperature that hydrates and forms the blue veins within the cheese product in the presence of free water. The size of the particulate preferably ranges from between about 0.25 millimeters to about 20 millimeters. However, any colorant, whether a solid or a liquid, that provides a veined appearance in the food product is within the scope of the present invention.

Preferred blue vein mimetics are manufactured by Quali Tech, Inc. of Chaska, Minn., under ingredient numbers 42-21-7 and 41-67-1C, which are preferably added in a 50-50 weight percent blend. The blue vein mimetics are added to the product between a range of about 0.01 and about 0.30 weight percent of the total weight of the cheese based product, and preferably about 0.1 weight percent of the cheese based product. The Quali Tech, Inc. blue vein mimetics are a solid at room temperature and when added to the cheese product hydrate over time to provide the characteristic blue veins to the cheese product.

To provide the characteristic blue veins, the product is worked for a time sufficient to disperse the blue vein mimetics in a random fashion through the cheese based product. Preferably, the blue vein mimetics are mixed into the product for approximately 30 seconds under agitation in the twin screw lay down process cheese cooker. After having been agitated into the cheese based product to form the desired blue vein coloring, the product is filled into molds for storage.

One skilled in the art will recognize that the product and method of the present invention provides several process advantages over making a blue veined cheese through the addition of mold spores. First, the amount of time required to manufacture the processed blue veined cheese product of the present invention is significantly reduced by eliminating the time needed for the mold spores to process the fat, proteins and sugars to produce the characteristic flavor and coloration of a natural blue veined cheese. In fact, the present invention does not require the use of mold spores to produce a product having the taste and appearance of a blue veined cheese product.

The method of the present invention also allows the manufacturer to separate and independently control the three main variables in the production of a blue veined cheese, namely, milk concentration, flavor development and visual (colored veins) development. Instead of having to rely upon the mold spores to develop the flavor and visual appearance of the blue veined cheese, the flavorant is added to a dairy based component having a selected fat to solids ratio and moisture content, such as a cheese curd, to provide a desired taste to the cheese based product. Once the desired taste of the product is attained, the coloring of the product is independently obtained by the addition of the blue vein mimetics. While the product of the present invention has the appearance and taste of a natural blue veined cheese such as Blue cheese, Stinton cheese, Roquefort cheese or Gorgonzola cheese, the product of the present invention is handled and processed as a process cheese. Namely, the process cheese product is more easily packaged, sliced and is also capable of being melted.

It has been discovered that the process of the present invention and the resulting products manufactured by the process have the organoelectric properties of a natural blue veined cheese product while eliminating the time necessary for the spores to generate the requisite flavor and coloring of the blue veined cheese product. Additionally, the blue veined cheese product of the present invention can be produced having a variety of flavors with varying intensity and a variety of shades of blue veins by independently controlling the amount and type of flavorant and the amount and the type of blue vein mimetic that are added to the cheese based product.

The following examples are illustrative only and are not intended to limit the scope of the present invention in any way.

Example 1

50 lbs. of fresh provolone curd was produced and the whey portion drained from the curd. The provolone curd was added to a paddle mixer manufactured by Marion Mixers, Inc. of Marion, Iowa. About 150 grams of dry cream, preferably Melocreme, manufactured by Kerry Ingredients of Beloit, Wis., and 75 grams of citric acid powder were added to the mixture. The mixture of Provolone curd, the dry cream and the citric acid were mixed in the paddle mixer for about 15 minutes such that a homogenous blend was obtained. After obtaining the homogenous blend, the pH was checked and adjusted with additional citric acid, as necessary to a target pH of about 5.30.

With the pH adjusted to about 530, about 401 grams of a salt mixture was added to the blend. The salt mixture included about 276 grams of an emulsifying salt, sodium phosphate, and about 125 grams of table salt, sodium chloride. With the salt mixture added to the homogenous blend, the blend was mixed in the paddle mixer for about 10 minutes to evenly disperse the salts within the homogenous blend.

After the salt blend was evenly dispersed within the homogenous mixture, about 4.9 lbs. of enzyme modified cheese flavored as blue cheese, manufactured by First Choice of Germantown, Wis., was added and mixed into the homogenous blend for about 5 minutes such that the flavorant was evenly distributed within the homogenous blend.

About 5 lbs. of Melocreme dry cream, manufactured by Kerry Ingredients of Beloit, Wis., was added to the blend to adjust the fat to solids ratio. The dry cream was mixed into the homogenous mixture for about 5 minutes such that the dry cream was evenly dispersed within the homogenous blend.

The homogenous blend was then transferred to a 13 lb. twin screw lay down process cheese cooker, manufactured by Custom Stainless Equipment of Santa Rosa, Calif. With the homogenous blend transferred into the twin screw lay down process cheese cooker, the agitators were engaged and steam was injected into the homogenous mixture until the homogenous mixture reached a temperature of about 165° F. for about 2 minutes. With the homogenous mixture at the temperature of 165° F. for about 2 minutes, the steam injection was removed from the cooker and the blend was held under agitation for a total cook cycle of about 3.5 minutes.

The agitation was removed from the homogenous blend, and 30 grams of a blue vein mimetic ingredient numbers 42-21-7 and 41-67-1C, manufactured by Quali Tech of Chaska, Minn. was added to the blend. The blend along with the blue vein mimetics were worked for about 30 seconds within the twin screw lay down process cheese cooker to produce the blue vein coloration within the cheese based product.

The blue vein mimetic, manufactured by Quali Tech, Inc. of Chaska, Minn. is a starch based product that is a solid at ambient temperature and hydrates in the presence of water. The starch based blue vein mimetic provides an even distribution in the veins and does not run or continue to disperse throughout the cheese based product over time. Rather, the blue vein mimetic remains in streaks or veins resembling that of a blue vein that is produced by mold spores during the process of making a natural blue veined cheese.

The product was removed from the cheese cooker and placed into 5 lb. loaf molds. The process blue veined cheese based product of the present invention is more easily transferred into a mold and formed into the shape of the mold, sliced and melted when heated than a natural blue veined cheese. The product of the present invention has a taste, appearance and texture similar to a natural blue veined cheese. Otherwise stated, the product of the present invention has the organoleptic properties of a natural blue veined cheese. However, while having the organoleptic properties of a natural blue veined cheese, the product of the present invention has the physical characteristics of a process cheese such as ease of processing, packaging, slicing and melting.

In an alternative method for producing the cheese product of the present invention, cheese curd is produced in a conventional fashion and is then mixed with a flavored non-curd cheese product such as an enzyme modified cheese product. Enzyme modified cheese is typically made from milk that has been concentrated through ultrafiltration and/or ultrafiltration with diafiltration and which may be further concentrated by evaporation. Various other dairy solids such as anhydrous milkfat, non-fat dry milk, protein isolates and concentrates may also be added to increase the amount of solids. A non-coagulating type enzyme is also typically added to add flavor, however, no curds are formed.

Such a non-curd dairy product is characterized by its homogeneous composition. The non-curd cheese product along with a colored vein mimetic is added to the cheese curd. The mixture is mixed without destroying the curd structure and pressed to form a colored veined cheese having an appearance and taste of a natural colored veined cheese.

Example 2

500 lbs. of milk were standardized to a fat:protein ration of 0.95 by the addition of skim milk powder and was then pasteurized. This milk was added to a pilot scale double "0" cheese vat, and 50 lbs of curd was produced by the addition of traditional cheese making cultures and rennet. After cooking, whey removal and fermentation, curd was milled to approximately ½"×¾"×2" in size. 50 lbs. of the curd was returned to the cheese vat, where 360 grams of NaCl and 150 grams of citric acid were added in three subsequent additions about 5 minutes apart. 5 lbs. of an enzyme modified cheese 2053.2 having a blue cheese flavor from First Choice Ingredients of Germantown, Wis. was added and mixed for 5 minutes, followed by 227 grams of blue vein mimetic ingredient number 44-78-5, manufactured by Quali Tech of Chaska, Minn. Product was packed into 25 lb hoops. The resulting product had the taste, appearance and texture of a natural blue veined cheese.

Another alternative method of making a cheese product of this invention involves adding a coloring dye and flavoring to a non-curd cheese product such as an enzyme modified cheese product. The non-curd cheese product is typically produced by ultrafiltering or ultrafiltering with diafiltration milk to concentrate the protein. Further concentration may be done by evaporation or by adding other dairy solids such as anhydrous milkfat, non-fat dry milk, protein isolates or concentrates, or both. An enzyme may be added to flavor the non-curd cheese product. Such a product has a homogenous texture. The non-curd cheese product is then blended with a natural cheese curd along with a colored vein mimetic and pressed into a cheese product whose visual appearance has colored seams (veins) between the pressed curds.

Example 3

31.3 grams of CSL33304 dye from Sensient Technologies 777 East Wisconsin Avenue, Milwaukee, Wis., was blended into 5 lbs. of an enzyme modified cheese 2040 having a blue cheese flavor from First Choice Ingredients of Germantown, Wis., and was set aside. 500 lbs. of milk were standardized to a fat:protein ration of 0.95 by the addition of skim milk powder and was then pasteurized. This milk was added to a pilot scale double "0" cheese vat, and 50 lbs of curd was produced by the addition of traditional cheese making cultures and rennet. After cooking, whey removal and fermentation, curd was milled to approximately ½"×¾"×2" in size. 22.5 lbs. of the curd was returned to the cheese vat, where 180 grams of NaCl and 75 grams of citric acid were added in three subsequent additions about 5 minutes apart. 2.03 lbs. of the colored and flavored enzyme modified cheese was then added to the milled, salted and acidified curd and the blended mixture was pressed into a 25 lb hoop. The resulting product displayed a blue-green seaminess around the curd and had the distinct flavor and odor of blue cheese.

Although the present invention has been described with reference to preferred embodiments, workers skilled in the art will recognize that changes may be made in form and detail without departing from the spirit and scope of the invention.

What is claimed is:

1. A cheese product comprising:
   cheese curd;
   a flavorant comprising enzyme modified cheese flavored as blue cheese in an amount sufficient to mimic flavoring of a blue veined cheese; and
   a colored vein mimetic comprising food starch and a colorant, the colored vein mimetic comprising particulates at room temperature, wherein the colored vein mimetic is interspersed within the cheese curd and is hydrated by moisture in the cheese curd thereby simulating blue colored veins created by mold spores in a natural cheese such that the product has the flavoring and an appearance of a natural veined cheese.

2. The product of claim 1 and wherein the amount of the colored vein mimetic is in a range of between about 0.25 weight percent and 20 weight percent of the total weight of the cheese product.

3. The product of claim 1, wherein the blue colored vein mimetic is in a range of between about 0.01 and about 0.30 weight percent of the total weight of the cheese product.

4. The product of claim 1, wherein the particulates are in a size range between about 0.25 millimeters and about 20 millimeters.

5. The product of claim 1, wherein the flavorant comprises an edible acid.

6. The product of claim 5, wherein the edible acid comprises one or more of citric acid, lactic acid, tannic acid, malic acid, gluconic acid, glycolic acid, pyruvic acid, glutamic acid, fumaric acid, succinic acid, isocitric acid, pimelic acid, linear polycarboxylic acids, and anhydrides that break down into edible acids on contact with water.

7. The product of claim 1, further comprising an emulsifier in an amount up to approximately 1.0 weight percent of the total weight of the cheese product.

8. The product of claim 1, further comprising a non-curd cheese.

9. The product of claim 1, wherein a curd structure of the cheese curd is retained in the product.

10. A cheese product comprising:
    cheese curd;
    a cheese flavorant; and
    a colored vein mimetic comprising food starch and a colorant, the colored vein mimetic comprising particulates at room temperature, wherein the colored vein mimetic is interspersed within the cheese curd and is hydrated by moisture in the cheese curd thereby simulating colored veins.

11. The product of claim 10 wherein the colored vein mimetic is in a range of between about 0.25 and about 20 weight percent of the total weight of the cheese product.

12. The product of claim 10, wherein the colored vein mimetic is in a range of between about 0.01 and about 0.30 weight percent of the total weight of the cheese product.

13. The product of claim 10, wherein the flavorant comprises an edible acid.

14. The product of claim 13, wherein the edible acid comprises one or more of citric acid, lactic acid, tannic acid, malic acid, gluconic acid, glycolic acid, pyruvic acid, glutamic acid, fumaric acid, succinic acid, isocitric acid, pimelic acid, linear polycarboxylic acids, and anhydrides that break down into edible acids on contact with water.

15. The product of claim 10, further comprising an emulsifier in an amount up to approximately 1.0 weight percent of the total weight of the cheese product.

16. The product of claim 10, further comprising a non-curd cheese.

17. The product of claim 10, wherein a curd structure of the cheese curd is retained in the product.

* * * * *

UNITED STATES PATENT AND TRADEMARK OFFICE
CERTIFICATE OF CORRECTION

| | |
|---|---|
| PATENT NO. | : 8,945,654 B1 |
| APPLICATION NO. | : 12/842433 |
| DATED | : February 3, 2015 |
| INVENTOR(S) | : John Vojtech et al. |

It is certified that error appears in the above-identified patent and that said Letters Patent is hereby corrected as shown below:

SPECIFICATION

| Column | Line | PTO | Should Be |
|---|---|---|---|
| 5 | 30 | "have the organoelectric" | -- have the organoleptic -- |
| 5 | 56 | "pH adjusted to about 530," | -- pH adjusted to about 5.30, -- |
| 7 | 8 | "scale double "0"" | -- scale double "O" -- |
| 7 | 46 | "scale double "0"" | -- scale double "O" -- |

Signed and Sealed this
Nineteenth Day of May, 2015

Michelle K. Lee
*Director of the United States Patent and Trademark Office*